US012625839B2

(12) United States Patent
Wu et al.

(10) Patent No.: US 12,625,839 B2
(45) Date of Patent: May 12, 2026

(54) METHOD FOR WIRELESSLY CONNECTING TO A WIRELESS USB INTERFACE EXTENDER DURING USE IN A WIRELESS PROJECTION SYSTEM, AND WIRELESS PROJECTION SYSTEM AND WIRELESS USB INTERFACE EXTENDER THEREFOR

(71) Applicant: BENQ CORPORATION, Taipei City (TW)

(72) Inventors: Chen-Chi Wu, Taipei City (TW);
Cheng-Pu Lin, Taipei City (TW);
Chia-Nan Shih, Taipei City (TW);
Yu-Ping Huang, Taipei City (TW);
Chao-Kuang Yen, Taipei City (TW);
Chin-Fu Chiang, Taipei City (TW);
Cheng-Chieh Juan, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 17 days.

(21) Appl. No.: 18/952,994

(22) Filed: Nov. 19, 2024

(65) Prior Publication Data

US 2025/0190392 A1 Jun. 12, 2025

(30) Foreign Application Priority Data

Dec. 11, 2023 (TW) .................................. 112148096

(51) Int. Cl.
*G06F 13/42* (2006.01)
(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS 10,684,972 B2 6/2020 Renard et al.
11,496,708 B2 11/2022 You et al.
(Continued)

FOREIGN PATENT DOCUMENTS

CN 107479847 B 12/2017
CN 111836098 A 10/2020
(Continued)

OTHER PUBLICATIONS

Search report by EPO on May 19, 2025.

*Primary Examiner* — Scott C Sun

(57) ABSTRACT
A wireless USB interface extender connected wirelessly during use in a wireless projection system is provided. When operating in a station mode, the wireless USB interface extender communicates with a conversion device by using a first wireless transmission unit. The conversion device is coupled to a display device. When operating in an access point mode, the wireless USB interface extender communicates with at least one other wireless USB interface extender, each being coupled to at least one USB device, by using a second wireless transmission unit. When the wireless USB interface extender operates in the station mode and the access point mode at the same time, the control unit processes a to-be-displayed picture and a signal corresponding to at least one of the at least one USB device to generate an integrated signal, transmitted to the display device through the conversion device for displaying on the display device.

24 Claims, 10 Drawing Sheets

(56)          References Cited

U.S. PATENT DOCUMENTS

| | | | |
|---|---|---|---|
| 11,895,437 B2 | 2/2024 | You et al. | |
| 12,089,734 B2 * | 9/2024 | Narke | A47B 3/083 |
| 2010/0232400 A1 | 9/2010 | Patil et al. | |
| 2013/0315132 A1 | 11/2013 | Hou et al. | |
| 2016/0224064 A1 * | 8/2016 | Fleisig | G06F 1/266 |
| 2022/0276974 A1 | 9/2022 | Renard et al. | |

FOREIGN PATENT DOCUMENTS

| | | | |
|---|---|---|---|
| CN | 111885412 A | 11/2020 |
| CN | 112015685 A | 12/2020 |
| CN | 112042183 A | 12/2020 |
| CN | 212412376 U | 1/2021 |
| CN | 112306435 A | 2/2021 |
| CN | 112351315 B | 2/2021 |
| JP | 2006164081 A1 | 6/2006 |
| TW | 1693834 B | 5/2020 |
| TW | 1713369 B | 12/2020 |
| TW | 1776211 B | 9/2022 |
| TW | 1848338 B | 7/2024 |
| WO | 2015094166 A1 | 6/2015 |

* cited by examiner

—410'

704

702

706

1

METHOD FOR WIRELESSLY CONNECTING TO A WIRELESS USB INTERFACE EXTENDER DURING USE IN A WIRELESS PROJECTION SYSTEM, AND WIRELESS PROJECTION SYSTEM AND WIRELESS USB INTERFACE EXTENDER THEREFOR

This application claims the benefit of Taiwan application Serial No. 112148096, filed Dec. 11, 2023, the subject matter of which is incorporated herein by reference.

BACKGROUND OF THE INVENTION

Field of the Invention

The invention relates in general to a method for wirelessly connecting to a wireless USB interface extender during use in a wireless projection system, and a wireless projection system and a wireless USB interface extender therefor.

Description of the Related Art

Along with the advance in computer technology and network communication, conference room meeting is directed towards combining computer technology and network communication to increase the convenience of meeting and incorporate more applicable functions.

Take the devices, such as microphone, speaker, and camera, which are often used in the meeting, for example. If these devices need to be used in corporation with a computer, their disposition will affect the convenience and quality of meeting. If the microphone, speaker, and camera are disposed in a wired manner, the location and distance to the host need to be considered. Being so, the arrangement of the microphone, speaker, and camera will be restricted and many inconveniences will be created during meeting.

Therefore, it has become a prominent task for the industries to provide a solution, which allows flexible arrangement of microphone, speaker, and camera, increases the convenience for conference room meeting, and improves the efficiency of meeting.

SUMMARY OF THE INVENTION

According to one embodiment of the present invention, a wireless universal serial bus (USB) interface extender is provided. The wireless USB interface extender includes a first wireless transmission unit, a second wireless transmission unit, and a control unit. The control unit is configured to control the first wireless transmission unit and the second wireless transmission unit. The control unit is further configured to enable each of the first wireless transmission unit and the second wireless transmission unit to operate in at least one of a station mode and an access point (AP) mode. When the wireless USB interface extender operates in the station mode, the wireless USB interface extender communicates with a conversion device by using the first wireless transmission unit. The conversion device is coupled to a display device. When the wireless USB interface extender is operates in the access point mode, the wireless USB interface extender communicates with at least one other wireless USB interface extender by using the second wireless transmission unit. Each of at least one other wireless USB interface extender is coupled to at least one USB device. When the wireless USB interface extender operates in the station mode and the access point mode at the same time, the control unit is further configured to process a to-be-displayed picture and a first signal corresponding to at least one of the at least one USB device. When the wireless USB interface extender operates in the station mode and the access point mode at the same time, the wireless USB interface extender communicates with at least one USB device coupled to at least one other wireless USB interface extender. The control unit is further configured to process a second signal corresponding to at least one of the at least one USB device coupled to at least one other wireless USB interface extender and communicate with an operating system of a host by using a standard USB driver, so that the operating system can retrieve at least one of the at least one USB device by identifying the at least one of the at least one USB device as a USB device of the host by using the standard USB driver.

The first wireless transmission unit and the second wireless transmission unit are respectively implemented by a first wireless transmission module and a second wireless transmission module, or the first wireless transmission unit and the second wireless transmission unit are implemented by a third wireless transmission module.

According to another embodiment of the present invention, a method for wirelessly connecting to a wireless USB interface extender during use in a wireless projection system is provided. The method includes the following steps. A wireless USB interface extender is provided. The wireless USB interface extender has a first wireless transmission unit, a second wireless transmission unit and a control unit. The control unit is used to control the first wireless transmission unit and the second wireless transmission unit and enable each of the first wireless transmission unit and the second wireless transmission unit to operate in at least one of a station mode and an access point mode. When the wireless USB interface extender operates in the station mode, the wireless USB interface extender communicates with a conversion device by using the first wireless transmission unit. The conversion device is coupled to a display device. When the wireless USB interface extender operates in the access point mode, the wireless USB interface extender communicates with at least one other wireless USB interface extender by using the second wireless transmission unit. Each of at least one other wireless USB interface extender is coupled to at least one USB device. When the wireless USB interface extender operates in the station mode and the access point mode at the same time, the control unit processes a to-be-displayed picture and a first signal corresponding to at least one of the at least one USB device. When the wireless USB interface extender operates in the station mode and the access point mode at the same time, the wireless USB interface extender communicates with the at least one USB device coupled to the at least one other wireless USB interface extender, and the control unit is further used to process a second signal corresponding to at least one of the at least one USB device, coupled to the at least one other wireless USB interface extender, and communicate with an operating system of a host by using a standard USB driver, so that the operating system can retrieve at least one of the at least one USB device by identifying the at least one of the at least one USB device as a USB device.

According to an alternate embodiment of the present invention, a wireless projection system is provided. The wireless projection system includes a first wireless USB interface extender, a second wireless USB interface extender, and a conversion device. Each of the first wireless USB interface extender and the second wireless USB interface extender includes a first wireless transmission unit, a second wireless transmission unit and a control unit. The control unit is used to control the first wireless transmission unit and the second wireless transmission unit. The control unit of the first wireless USB interface extender or the second wireless USB interface extender is further used to enable each of the first wireless transmission unit and the second wireless transmission unit of the first wireless USB interface extender or each of the first wireless transmission unit and the second wireless transmission unit of the second wireless USB interface extender to operate in at least one of a station mode and an access point mode. The conversion device is coupled to a display device. When the first wireless USB interface extender operates in the station mode, the first wireless USB interface extender communicates with the conversion device by using the first wireless transmission unit. When the first wireless USB interface extender operates in the access point mode, the first wireless USB interface extender communicates with the second wireless USB interface extender by using the second wireless transmission unit, and the second wireless USB interface extender is coupled to at least one first USB device. When the first wireless USB interface extender operates in the station mode and the access point mode at the same time, the control unit of the first wireless USB interface extender is used to process a to-be-displayed picture and a first signal of the at least one first USB device. When the first wireless USB interface extender operates in the station mode and the access point mode at the same time, the first wireless USB interface extender communicates with the at least one USB device coupled to the second wireless USB interface extender, the control unit processes a second signal corresponding to at least one of the at least one USB device coupled to the second wireless USB interface extender and communicate with an operating system of a host by using a standard USB driver, so that the operating system can retrieve at least one of the at least one USB device by identifying the at least one of the at least one USB device as a USB device of the host.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
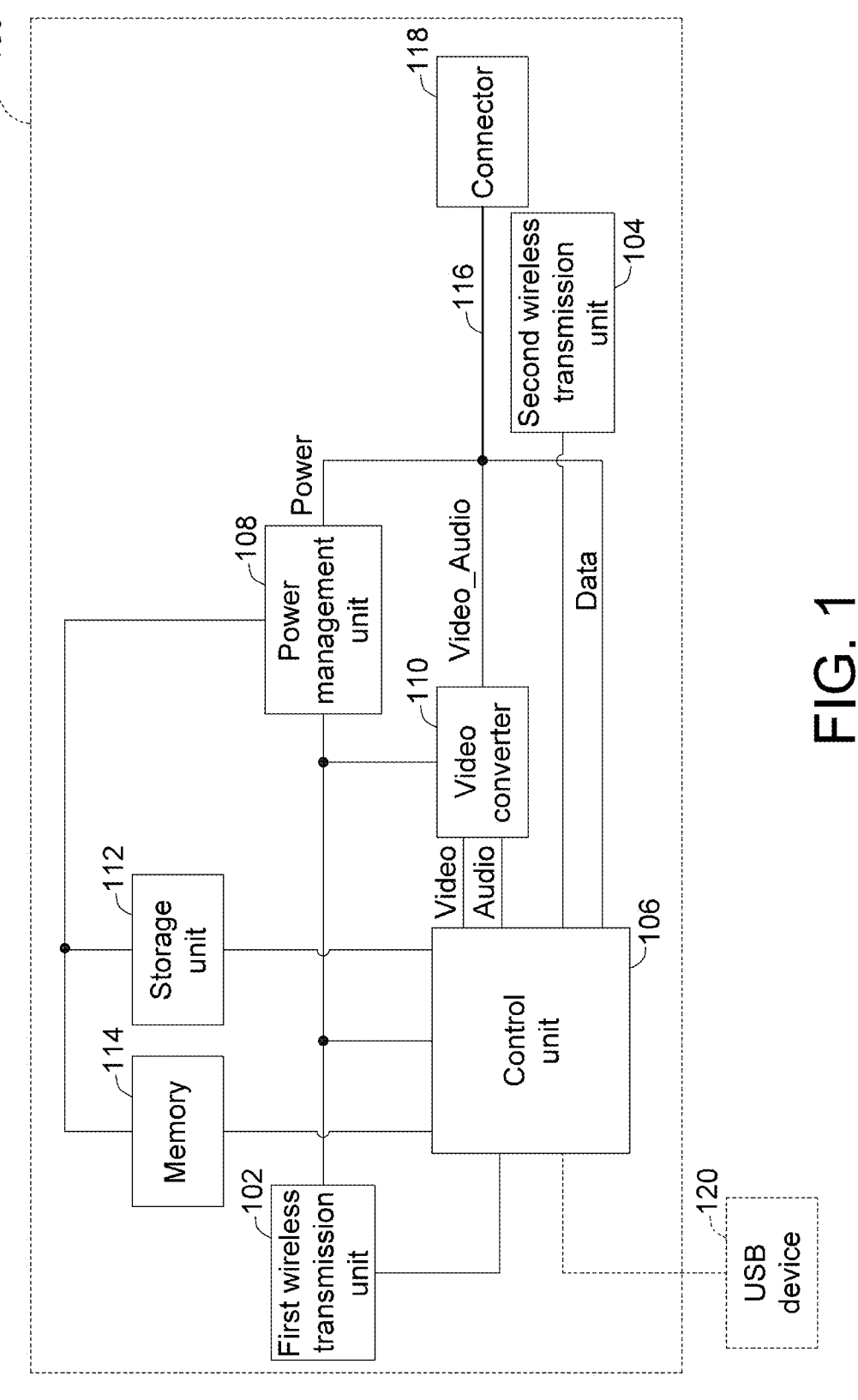
FIG. 1 is a block diagram of a wireless USB interface extender according to an embodiment of the present disclosure.
Figure 2:
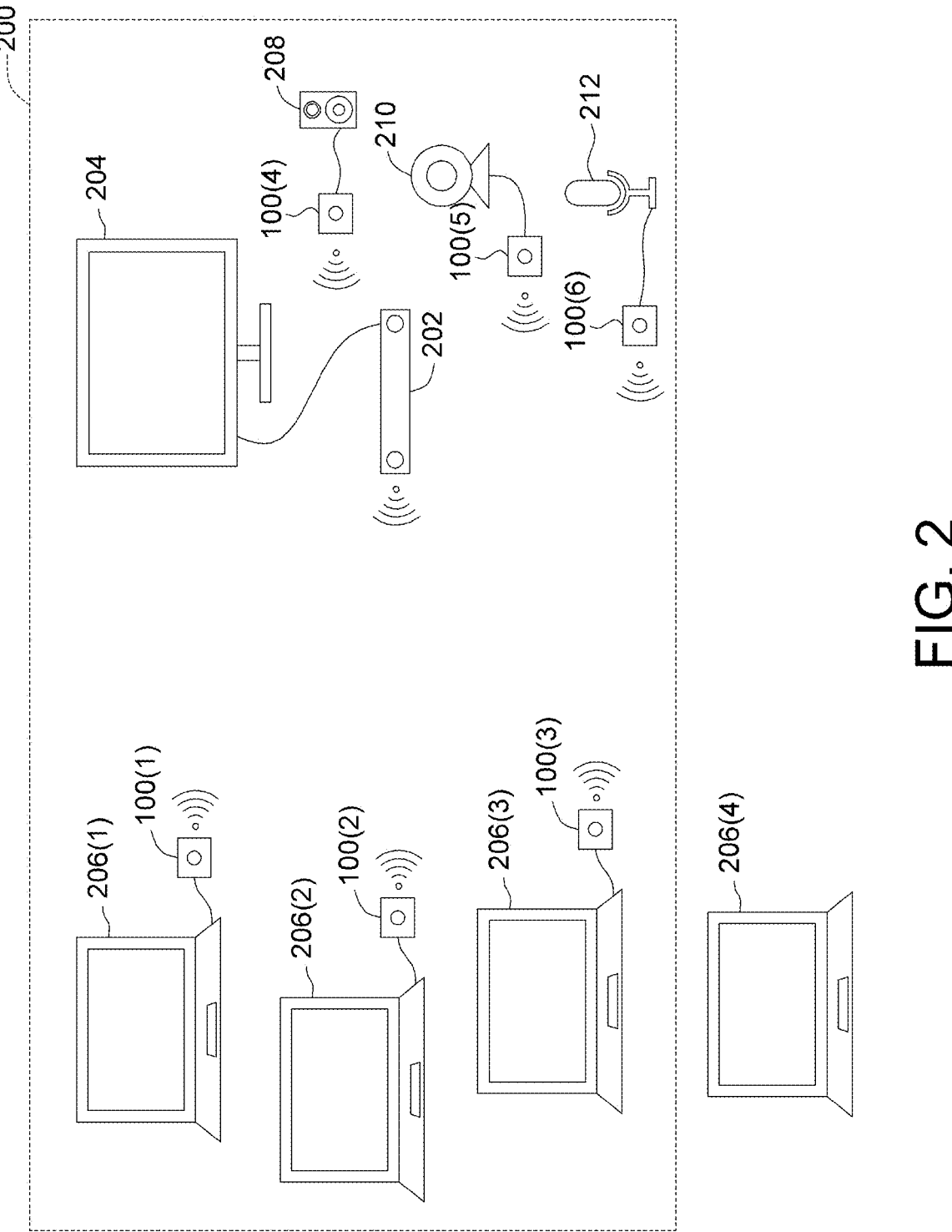
FIG. 2 is a schematic diagram of a wireless projection system using the wireless USB interface extender of FIG. 1 according to an embodiment of the present disclosure.

Referring to FIG. 1 and FIG. 2 at the same time. FIG. 1 is a block diagram of a wireless USB (Universal Serial Bus) interface extender 100 according to an embodiment of the present disclosure. FIG. 2 is a schematic diagram of a wireless projection system 200 using the wireless USB interface extender of FIG. 1 according to an embodiment of the present disclosure. In the process of using the wireless projection system 200, the wireless USB interface extension devices 100, such as wireless USB interface extenders 100(1)~100(6) are wirelessly connected to.

The wireless projection system 200 includes wireless USB interface extenders 100(1)~100(6) and a conversion device 202. Each of the wireless USB interface extenders 100(1)~100(6) includes a first wireless transmission unit 102, a second wireless transmission unit 104 and a control unit 106. The control unit 106 of each of the wireless USB interface extenders 100(1)~100(6) is used to control the first wireless transmission unit 102 and the second wireless transmission unit 104 of each of the wireless USB interface extenders 100(1)~100(6). The control unit 106 of each of the wireless USB interface extenders 100(1)~100(6) is further used to enable the first wireless transmission unit 102 and the second wireless transmission unit 104 of each of the wireless USB interface extenders 100(1)~100(6) to operate in at least one of a station mode and an access point mode. The conversion device 202 is coupled to a display device 204. The first wireless transmission unit 102 and the second wireless transmission unit 104 can respectively be implemented by such as a first wireless transmission module and a second wireless transmission module. Or, the first wireless transmission unit 102 and the second wireless transmission unit 104 are implemented by such as a single wireless transmission module (such as the wireless transmission module 102' of FIG. 3), such as a wireless transmission module capable of performing the WiFi-DIRECT function. The wireless transmission module can be implemented, for example, by a wireless network card, and can be configured to have the WiFi hotspot function and the station function and provides temporary hotspot sharing.

Let the wireless USB interface extender 100 represent one of the wireless USB interface extenders 100(1)~100(6). When operating in a station mode, the wireless USB interface extender 100 communicates with the conversion device 202 by using the first wireless transmission unit 102.

When operating in an access point mode, the wireless USB interface extender 100 communicates with at least one other wireless USB interface extender by using the second wireless transmission unit 104. Each of the at least one other wireless USB interface extender is coupled to at least one USB device 120.

When the wireless USB interface extender 100 operates in the station mode and the access point mode at the same time, the control unit 106 is further used to process a to-bedisplayed picture and a first signal corresponding to at least one of the at least one USB device to generate an integrated signal. The integrated signal is transmitted to the display device 204 through the conversion device for displaying on the display device 204. Detailed descriptions of the above operations are disclosed below.

As shown in FIG. 2, the wireless projection system 200 can be provided with a display device 204, a number of audio/video output devices (such as audio/video output devices 206(1)~206(3)) and a number of USB devices in addition to a number of wireless USB interface extender 100(such as wireless USB interface extenders 100(1)~100 (6)) and the conversion device 202. The audio/video output device can be implemented by a computer or a host, for example. The USB device can be implemented by a USB audio player 208 (such as a speaker or a loudspeaker), a USB image capture device 210 (such as a camera), or a USB voice capture device 212 (such as a microphone), for example. The wireless USB interface extenders 100(1)~100(3) are respectively coupled to the audio/video output devices 206(1)~206 (3); the wireless USB interface extenders 100(4)~100(6) are respectively coupled to the USB audio player 208, the USB image capture device 210 and the USB voice capture device 212.

The wireless USB interface extender 100 can be provided with the function of a wireless presentation system (WPS). Suppose the wireless USB interface extender 100(3) operates in a station mode and an access point mode. The wireless USB interface extender 100(3) can obtain the access point service set identifier (AP SSID) and password of the conversion device 202 by executing the pairing procedure in advance. After the wireless USB interface extender 100(3) is activated, the wireless USB interface extender 100(3) operating in the station mode and the access point mode will be connected to the access point, which has obtained the access point code and password in advance and completed pairing in advance, such as the conversion device 202. Next, the wireless USB interface extender 100(3) operating in the station mode and the access point mode can transmit the audio/video signal of the image output device 206(3) to the conversion device 202, which then transmits the audio/video signal to the display device 204 to complete projection.

Suppose the wireless USB interface extenders 100(1) and 100(2) operate in the station mode, and the conversion device 202 is provided with the function of integrating the received audio/video signals. Thus, the wireless USB interface extenders 100(1) and 100(2), by using the WPS projection function, can transmit the audio/video signals, outputted by the audio/video output devices 206(1) and 206(2), to the conversion device 202, which then integrates the received signal and outputs the integrated audio/video signal to the display device 204 for displaying. The display device 204 can concurrently display the audio/video signals outputted by the audio/video output devices 206(1) and 206(2) side by side.

On the other hand, when operating in the station mode and the access point mode at the same time, the wireless USB interface extender 100 communicates with at least one USB device coupled to at least one other wireless USB interface extender The control unit 106 is further used to process a second signal corresponding to at least one of the at least one USB device coupled to at least one other wireless USB interface extender. The control unit 106 further communicates with an operating system of a host (such as audio/video output device) by using a standard USB driver, so that the operating system can retrieve at least one of the at least one USB device by identifying the at least one of the at least one USB device as a USB device of the host by using the standard USB driver.

For example, the wireless USB interface extender 100 operating in the station mode (such as wireless USB interface extenders 100(4)~100(6) coupled to the USB devices) transmits the signal to the wireless USB interface extender 100 operating in the access point mode (such as wireless USB interface extender 100(3) coupled to the audio/video output device 206(3)). The wireless USB interface extender 100 operating in the access point mode can integrate a number of received signals, including the audio/video signal (such as the audio/video signal outputted by the audio/video output device) received through wired connection and the signal(s) received wireless connection (such as the signal(s) of USB devices transmitted by other wireless USB interface extender(s) 100 through wireless connection). The wireless USB interface extender 100 operating in the access point mode can also operate in the station mode at the same time, and can transmit the integrated signal to the conversion device 202 operating in the access point mode. For example, the wireless USB interface extender 100(3) coupled to the audio/video output device 206(3) can integrate the audio/video signal received from the audio/video output device 206(3) and the USB signals received from the wireless USB interface extenders 100(5) and 100(6), then transmit the integrated signal to the conversion device 202, then the integrated signal is outputted to the display device 204 by the conversion device 202. Besides, the integrated signal also can be transmitted to the audio/video output device 206, such as the audio/video output device 206(3), for displaying.

Moreover, when operating in the station mode and the access point mode at the same time, the wireless USB interface extender 100(3) communicates with at least one USB device (such as USB audio player 208) coupled to the wireless USB interface extender 100(4). The control unit 106 of the wireless USB interface extender 100(3) is further used to process a second signal corresponding to at least one of the at least one USB device (such as USB audio player 208) coupled to the wireless USB interface extender 100(4). The control unit 106 further communicates with an operating system of the host (such as audio/video output device 206(3)) by using a standard USB driver, so that the operating system can retrieve at least one of the at least one USB device (such as USB audio player 208) by identifying the at least one of the at least one USB device (such as USB audio player 208) as a USB device of the host (such as audio/video output device 206(3)) by using the standard USB driver.

When operating in the station mode and the access point mode at the same time, the wireless USB interface extender 100(3) also can communicate with at least one USB device (such as USB image capture device 210 and USB voice capture device 212) coupled to the wireless USB interface extenders 100(5) and 100(6). The control unit 106 of the wireless USB interface extender 100(3) is further used to process the signal(s) corresponding to at least one of the at least one USB device (such as USB image capture device 210 and USB voice capture device 212) coupled to the wireless USB interface extenders 100(5) and 100(6). The control unit 106 further communicates with an operating system of the host (such as audio/video output device 206(3)) by using a standard USB driver, so that the operating system can retrieve at least one of the at least one USB device (such as USB image capture device 210 and USB voice capture device 212) by identifying the at least one of the at least one USB device (such as USB image capture device 210 and USB voice capture device 212) as a USB device of the host (such as audio/video output device 206(3)) by using the standard USB driver.

Besides, between two different wireless USB interface extenders 100, there could be two different wireless USB interface extenders 100 operating in the station mode at the same or operating in the access point mode at the same.

In the access point mode, the function of a USB interface server is performed (such as the function of a USB hub server); in the station mode, the function of a USB interface client is performed (such as the function of a USB hub client). The wireless USB interface extender 100 can perform the function of a USB interface server and the function of a USB interface client at the same time or can perform only the function of a USB interface client. In the exemplification below, the wireless USB interface extender 100(3) performs the function of a USB interface server and the function of a USB interface client at the same time, and the wireless USB interface extenders 100(4)~100(6) perform only the function of a USB interface client.

When operating as the wireless USB interface extender of an access point (such as wireless USB interface extender 100(3)), the wireless USB interface extender 100 has the ability of communicating with the operating system (by using a USB standard driver), and the operating system (such as a Windows operating system) identifies the wireless USB interface extender 100 as a standard USB device. For example, the wireless USB interface extender 100 can be set as a USB hub. When the wireless USB interface extender 100 is connected to the device equipped with an operating system, the operating system identifies the wireless USB interface extender 100 as a standard USB hub (for example, the operating system identifies the wireless USB interface extender 100(3) as a standard USB hub); meanwhile, a standard USB hub driver is loaded and therefore the wireless USB interface extender 100 can communicate with the operating system. Such mode is called "USB non-pass-through mode". The wireless USB interface extender 100 is regarded as being in the wireless USB hub mode. For example, the wireless USB interface extender 100(3) will be identified as a USB hub by the operating system and wait for external USB devices physically connected to the wireless USB interface extenders 100(4)~100(6). When there are external USB devices connected to the wireless USB interface extenders 100(4)~100(6), these external USB devices will be regarded as external devices, which are directly connected to the USB hub corresponding to the wireless USB interface extender 100(3) and appear in the operating system. For example, when the USB image capture device 210 is connected to the wireless USB interface extender 100(5), the operating system firstly identifies the USB hub of the wireless USB interface extender 100(3) then generates the USB device (USB image capture device 210) connected with the USB hub.

When operating as the wireless USB interface extender of an access point (such as wireless USB interface extender 100(3)), the wireless USB interface extender 100 is set to a "USB pass-through mode". That is, the wireless USB interface extender 100 does not need to generate a physical USB device on the operating system, the wireless USB interface extender 100 wait for the external USB device to be physically inserted to the wireless USB interface extenders 100(4)~100(6), then directly reflect the USB device coupled to the wireless USB interface extenders 100(4)~100(6). For example, the wireless USB interface extender 100(5) has a USB image capture device 210 inserted thereto; meanwhile, the operating system directly generates a USB device of the USB image capture device 210. Such mode is called "USB pass-through mode".

Data transmission between two wireless USB interface extenders can be done by converting USB data into network (IP) data and converting network data into USB data. For example, data transmission between two wireless USB interface extenders 100 can be done by converting the data of an external USB device, that is, converting USB data into network data and converting network data into USB data, and transmitting data between two wireless USB interface extenders. For example, when a USB image capture device 210 is connected to the wireless USB interface extender 100(5), the wireless USB interface extender 100(5) retrieves USB device packets from the USB image capture device 210 and converts the retrieved USB device packets into network data, then communicates with the wireless USB interface extender 100(3) through wireless connection. In the same way, the USB device packets of the wireless USB interface extenders 100(4)~100(6) can be transmitted to the wireless USB interface extender 100(3). The wireless USB interface extender 100(3) operating in the access point can integrate the received signals, then convert the network packets of each of the wireless USB interface extenders 100(4)~100(6) back to the USB standard device packets, and communicate with the operating system according to the "USB non-pass-through mode" or "USB pass-through mode" mentioned above.

For example, after the USB data stream of USB image capture device 210 is converted to wireless network packets by the wireless USB interface extender 100(5), the wireless network packets are wirelessly transmitted to the wireless USB interface extender 100(3). Then, the wireless USB interface extender 100(3) decodes the wireless network packets to obtain a USB data stream, and further transmits the USB data stream to the audio/video output device 206(3). By using a third-party software (such as Internet communication software or live broadcast software), the audio/video output device 206(3) further transmits the image captured by the USB image capture device 210 to the audio/video output device 206(4) connected via the Internet. For example, the audio signal captured by the audio/video output device 206(4) can be transmitted to the audio/video output device 206(3) via the Internet. Then, via an established wireless connection, the audio signal captured by the audio/video output device 206(4) is outputted to the USB audio player 208 for playing through the wireless USB interface extender 100(3) and the wireless USB interface extender 100(4).

Before the wireless network packets can be transmitted between the wireless USB interface extender 100(3) and the wireless USB interface extenders 100(4)~100(6), each of the above wireless USB interface extenders executes a station mode/access point mode setting procedure and a pairing procedure for setting the wireless USB interface extender 100(3) to a station mode and access point mode and setting the wireless USB interface extenders 100(4)~100(6) to a station mode, so that pairing between the wireless USB interface extender 100(3) and each of the wireless USB interface extenders 100(4)~100(6) can be respectively completed. For example, after executing the station mode/access point mode setting procedure, the wireless USB interface extender 100(6) coupled to the USB voice capture device 212 can set itself to the station mode and execute the pairing procedure to search for the wireless USB interface extender 100 operating in the access point mode, such as the wireless USB interface extender 100(3). Suppose the wireless USB interface extender 100(3), which connected to the audio/video output device 206(3) and found by the wireless USB interface extender 100(6), operates in the access point mode, the wireless USB interface extender 100(6) records relevant connection information of the wireless USB interface extender 100(3). Then, the wireless USB interface extender 100(6) records that wireless connection with the wireless USB interface extender 100(3) is successfully completed, and the wireless USB interface extender 100(6) and the wireless USB interface extender 100(3) can start to transmit data stream to each other. The wireless transmission mentioned above can be completed according to the Wi-Fi direct (also referred as Wi-Fi peer-to-peer) communication protocols.

Refer to FIG. 1 again. The wireless USB interface extender 100 can further include a power management unit 108, a video converter 110, a storage unit 112, a memory 114, a transmission line 116 and a connector 118. The power management unit 108 can be implemented by, for example, a power IC. The storage unit 112 can be implemented by a flash memory, such as an embedded multimedia card (EMMC). The memory 114 can be implemented by a dynamic random-access memory (DRAM), such as a double data rate SDRAM (DDR SDRAM). The storage unit 112 can be used to store relevant data or programming codes. The memory 114 can be used to temporarily store relevant data. The data mentioned above can be to-be-displayed images, to-be-played audio/video signals, or integrated signals.

The transmission line 116 can be implemented by a USB type-C transmission line; the connector 118 can be implemented by a USB type-C connector. After power supply is provided to the wireless USB interface extender 100 via the transmission line 116, the power (marked as "Power") is provided to the power management unit 108 then to the storage unit 112, from which power is distributed to elements such as the control unit 106 and the first wireless transmission unit 102 for making them operate. For example, after an audio/video signal Video_Audio is transmitted to the wireless USB interface extender 100 via the transmission line 116, the audio/video signal Video_Audio is transmitted to the video converter 110, which then converts the format of the audio/video signal Video_Audio into the format of the audio/video signal Video_Audio readable to the control unit 106, divides the audio/video signal Video_Audio into a video signal Video and an audio signal Audio, and transmits the video signal Video and the audio signal Audio to the control unit 106.

After the wireless USB interface extender 100 is activated, the control unit 106 sets the wireless USB interface extender 100 to operate in the station mode, and the wireless USB interface extender 100 communicates with the conversion device 202 by using the first wireless transmission unit 102 through wireless connection. When wireless projection is activated, the control unit 106 compresses and encodes the video signal Video and audio signal Audio provided by the video converter 110 to generate a data stream and further converts the data stream into wireless packets, then transmits the wireless packets to the conversion device 202 operating in the access point mode through wireless transmission by using the first wireless transmission unit 102. After decoding the received wireless packets, the conversion device 202 transmits corresponding video signal Video and audio signal Audio to the display device 204 to complete the WPS projection function.

When the wireless USB interface extender 100 intends to operate in the access point mode, the control unit 106 of the wireless USB interface extender 100, based on the function of the USB on-the-go (OTG) standard or the built-in USB host function of the control unit 106, the wireless USB interface extender 100 can change its role from a USB peripheral device to a USB host capable of communicating with other USB device. As for the audio/video output device connected to the wireless USB interface extender 100, the wireless USB interface extender 100 is still used as a USB peripheral device. The USB OTG complies with the USB 2.0 supplementary standard. The function of USB OTG enables the USB device to have double roles of host and device but at the same time can only play one of the two roles. The USB OTG enables the USB device to change its role from a USB peripheral device to a USB host capable of communicating with USB device. Under normal circumstances, the USB device and USB host that support the USB OTG still can be used as a USB peripheral device.

Thus, the wireless USB interface extender 100 can simulate the role of a USB interface server for the USB host of the audio/video output device (such as a computer) to identify. For example, the wireless USB interface extender 100 can simulate the roles of a USB human interface device (HID) (such as keyboard or mouse), a USB massive device, a USB microphone, and a USB interface device. In the present embodiment, the wireless USB interface extender 100 can simulate the roles of a USB HID and a USB interface (such as a USB hub).

When the wireless USB interface extender 100 intends to operate in the station mode, the wireless USB interface extender 100 does not have to be connected to a computer. For example, when the wireless USB interface extender 100(5) performs the USB host function of the USB OTG on the control unit 106 and therefore is coupled to the USB image capture device 210, the wireless USB interface extender 100(5) will identify the USB image capture device 210 and load in relevant driver for the USB image capture device 210 to operate normally. Then, the wireless USB interface extender 100(5) converts the USB device data packets of the USB image capture device 210 into wireless network packets by using firmware, then transmits the wireless network packets to the wireless USB interface extender 100(3) by using the first wireless transmission unit 102 of the wireless USB interface extender 100(5). After the wireless packets are received by the second wireless transmission unit 104 of the wireless USB interface extender 100(3), the control unit 106 of the wireless USB interface extender 100(3) decodes the received wireless packets as USB device packets, which is then identified by a Windows USB host. Then, the computer can use the USB image capture device 210 through a standard Windows driver. After that, the USB image capture device 210 can be regarded as an image capture device of a computer and can be designated to a third-party software.

Figure 3:
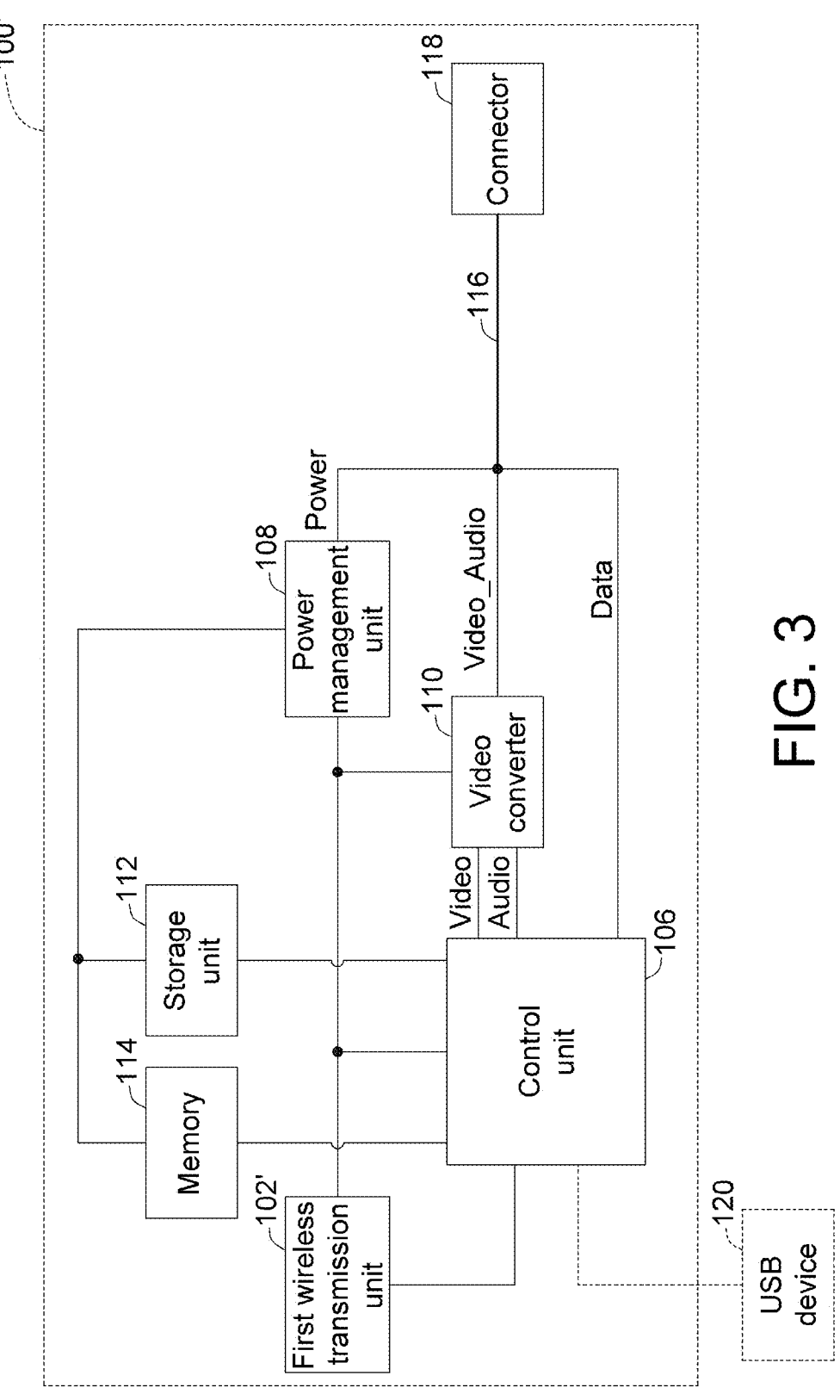
FIG. 3 is a block diagram of a wireless USB interface extender according to another embodiment of the present disclosure.

Referring to FIG. 3, a block diagram of a wireless USB interface extender 100 according to another embodiment of the present disclosure is shown. In another embodiment, the first wireless transmission unit 102 and the second wireless transmission unit 104 of the wireless USB interface extender 100 can be implemented by the same wireless transmission module 102', that is, the wireless transmission module 102' can perform the transmission and reception of wireless network packets, which are originally done by the first wireless transmission unit 102 and the second wireless transmission unit 104, as shown in FIG. 3.

Figure 4A:
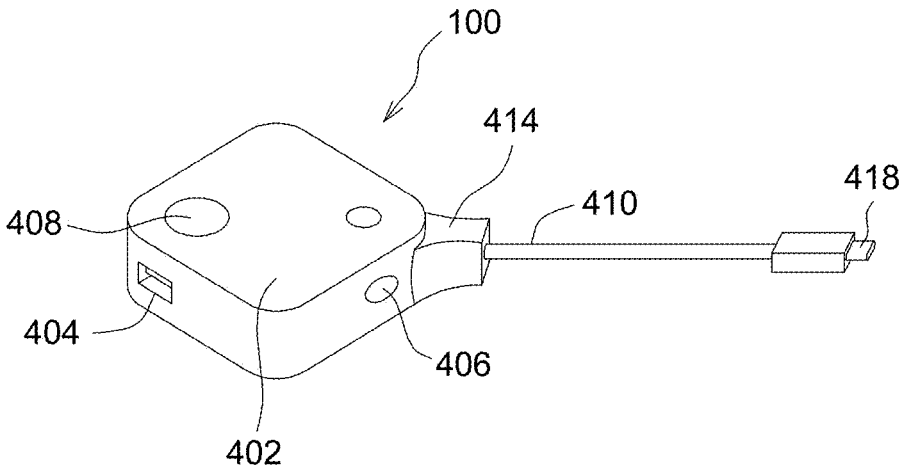
FIG. 4A is a three-dimensional diagram of the wireless USB interface extender.
Figure 4B:
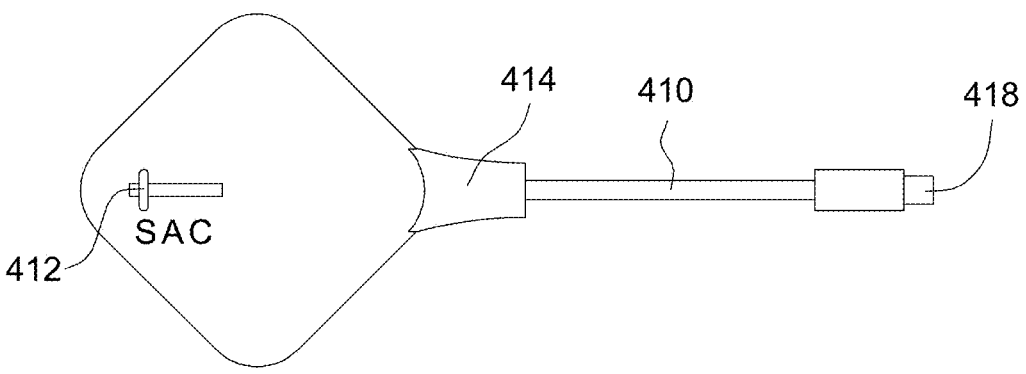
FIG. 4B is a top view of the wireless USB interface extender.
Figure 4C:
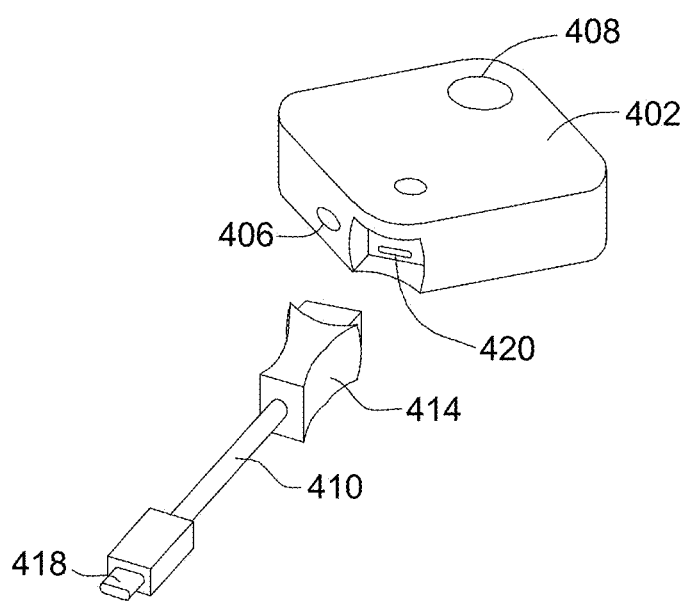
FIG. 4C is a disassembly diagram of a wireless USB interface extender.
Figure 4D:
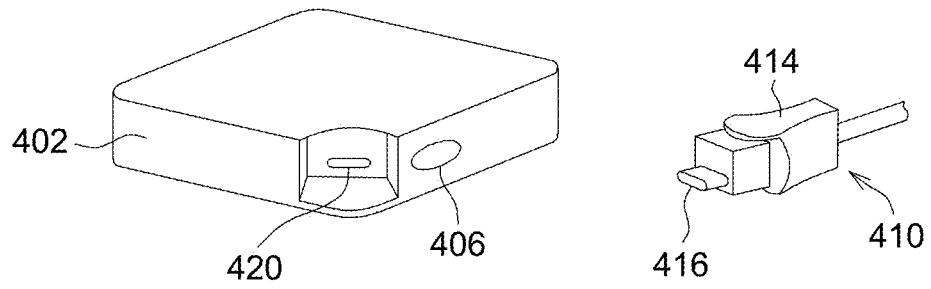
FIG. 4D is another disassembly diagram of a wireless USB interface extender.

Referring to FIGS. 4A~4D, diagrams of structure of a wireless USB interface extender according to an embodiment of the present disclosure are shown. FIG. 4A is a three-dimensional diagram of the wireless USB interface extender. FIG. 4B is a top view of the wireless USB interface extender. FIG. 4C is a disassembly diagram of a wireless USB interface extender. FIG. 4D is another disassembly diagram of a wireless USB interface extender.

The appearance of the wireless USB interface extender 100 shows that the wireless USB interface extender 100 further includes a body 402, a wired input port 404, a pairing key 406, a projection key 408, a cable 410, and a lever element 412.

As shown in FIG. 4A, the wired input port 404 can be located on a lateral side of the body 402; the connector of another USB device (such as a USB type-A connector) can be inserted to the wired input port 404, so that the wireless USB interface extender 100 can be coupled to another USB device. The pairing key 406 can be located on another lateral side of the body 402. When the pairing key 406 is pressed, pairing between the wireless USB interface extender 100 and the conversion device 202 can be activated, or pairing between the wireless USB interface extender 100 and another wireless USB interface extender can be activated. The projection key 408 can be located on an upper surface of the wireless USB interface extender 100, for example. When the projection key 408 is pressed, the wireless projection function of the wireless USB interface extender 100 is activated, so that the picture outputted by the wireless USB interface extender 100 is transmitted to the display device 204 for playing through the conversion device 202.

As shown in FIG. 4B, the lever element 412 can be located on a lower surface of the wireless USB interface extender 100. When the lever element 412 is flopped, the mode of the wireless USB interface extender 100 is changed. As shown in FIG. 4B, the lever element 412 can be switched to a server option S, a client option C, and an automatic switch option A. When the lever element 412 is switched to the server option S, the wireless USB interface extender 100 operates in the access point mode. When the lever element 412 is switched to the client option C, the wireless USB interface extender 100 operates in the station mode. When the lever element 412 is switched to the automatic option A, the wireless USB interface extender 100 automatically operates in the station mode under the situation that the wired input port 404 has another USB device connected thereto.

As shown in FIG. 4C, the cable 410 is detachably connected to the body 402. When the first wireless transmission unit 102 and the second wireless transmission unit 104 of the wireless USB interface extender 100 are respectively implemented by the first wireless transmission module and the second wireless transmission module, the second wireless transmission module of the wireless USB interface extender 100(having the wireless transmission unit 104) is exemplarily disposed in the cable 410; preferably, it is disposed at the top end 414 of the cable 410. When the cable 410 is connected to the body 402, the second wireless transmission unit 104 can be electrically connected to the control unit 106 of the wireless USB interface extender 100, and the second wireless transmission unit 104 is available. When the cable 410 is not connected to the body 402, the second wireless transmission unit 104 is not electrically connected to the control unit 106 of the wireless USB interface extender 100; meanwhile, the second wireless transmission unit 104 is unavailable.

FIG. 4D, another disassembly diagram of a wireless USB interface extender, shows the body 402 with a connector and the top end 414 of the cable 410 with a connector. The connector mentioned above can be implemented by a USB type-C connector. The connector 118 can be implemented by such as a USB type-C connector 420 located on a lateral side of the body 402. The top end 414 of the cable 410 also has a USB type-C connector 416. When the cable 410 is coupled to the body 402, the USB type-C connector 420 is electrically connected to the USB type-C connector 416, so that the power and the signal can be transmitted through the mutually coupled USB type-C connector 420 and USB type-C connector 416.

Figure 5:
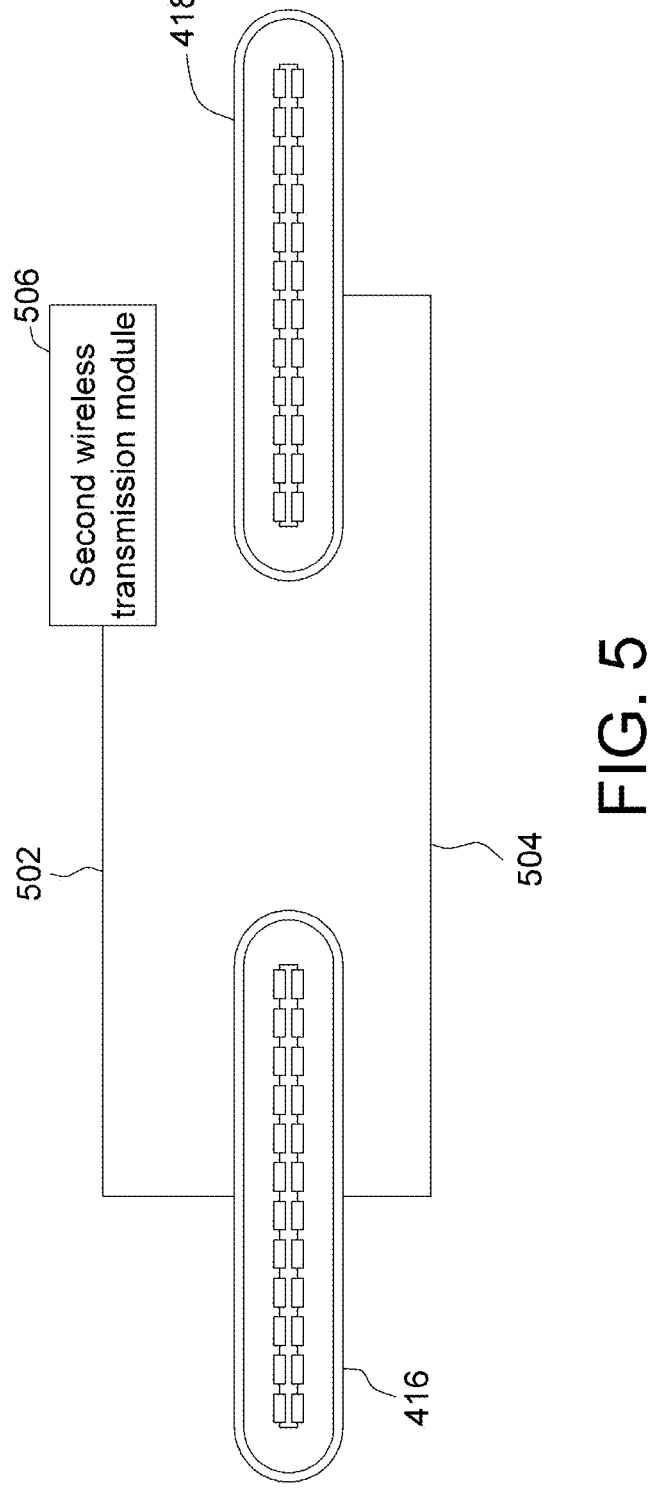
FIG. 5 is a relevant wiring diagram of a second wireless transmission unit disposed in a cable.

Also, referring to FIG. 5, a relevant wiring diagram of a second wireless transmission unit 104 disposed in a cable 410 is shown. Since the USB type-C allows that the pins can be defined by the user, the second wireless transmission module 506 of the wireless USB interface extender 100 (including the second wireless transmission unit 104 and the antenna used by the second wireless transmission unit 104) according to an embodiment of the present disclosure can be electrically connected to some pins of the USB type-C connector 416 though the wire 502. Some other pins of the USB type-C connector 416 can be electrically connected to the USB type-C connector 418 disposed at the other end of the cable 410 through the wire 504. When the USB type-C connector 416 is electrically connected to the USB type-C connector 420, the USB type-C connector 416 can be electrically connected to the main circuit board of the wireless USB interface extender 110 (not shown). The main circuit board has elements disposed thereon, such as the control unit 106, the first wireless transmission unit 102, the power management unit 108, the video converter 110, the storage unit 112, and the memory 114 of FIG. 1. The transmission line 116 (such as USB type-C transmission line) in FIG. 1 is electrically connected to the USB type-C connector 416 through the USB type-C connector 420. Thus, when the USB type-C connector 418 is electrically connected to the audio/video output device (such as a computer), the audio/video signal Video, data Data, and power Power outputted by the audio/video output device will be transmitted to the wireless USB interface extender 100 via the transmission line 116.

Figure 6:
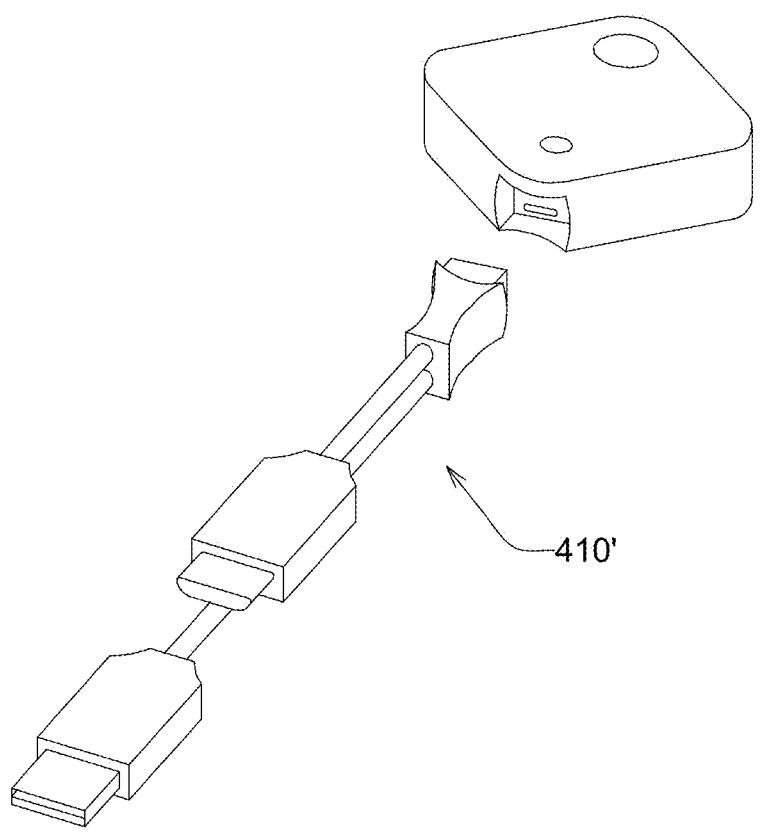
FIG. 6 is a disassembly diagram of another example of a wireless USB interface extender.

Referring to FIG. 6, a disassembly diagram of another example of a wireless USB interface extender is shown. The cable 410' of FIG. 6 is different from the cable 410 of FIG. 4C in having two transmission lines. One is an HDMI transmission line, and the other is a transmission line of USB type-A. The two types of transmission lines can serve user's different needs.

Figure 7:
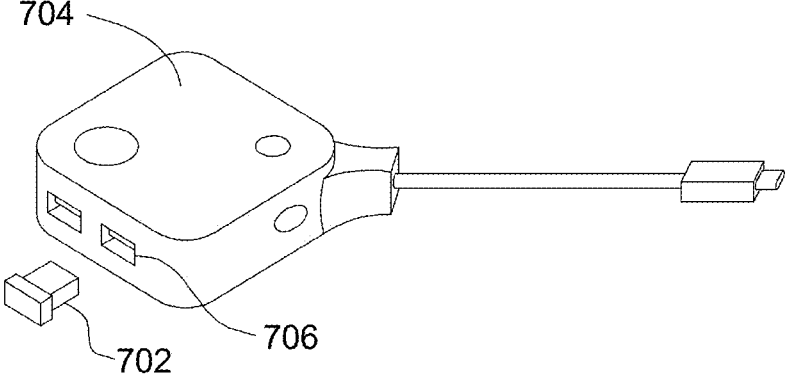
FIG. 7 is a schematic diagram of an example of a wireless USB interface extender using a dongle.

Referring to FIG. 7, a schematic diagram of an example of a wireless USB interface extender 100 using a dongle is shown. The wireless USB interface extender 100 can further include a dongle 702 pluggably connected to the body 704. The second wireless transmission module (including the second wireless transmission unit 104 and the antenna used by the same) can be disposed on the dongle 702. That is, when the second wireless transmission unit 104 implemented by the second wireless transmission module is to be used, the dongle 702 can be inserted to the slot 706, so that the second wireless transmission unit 104 is electrically connected to the control unit 106 of the wireless USB interface extender 100. When the second wireless transmission unit 104 is not in use, the dongle 702 can be unplugged from the slot 706.

Figure 8:
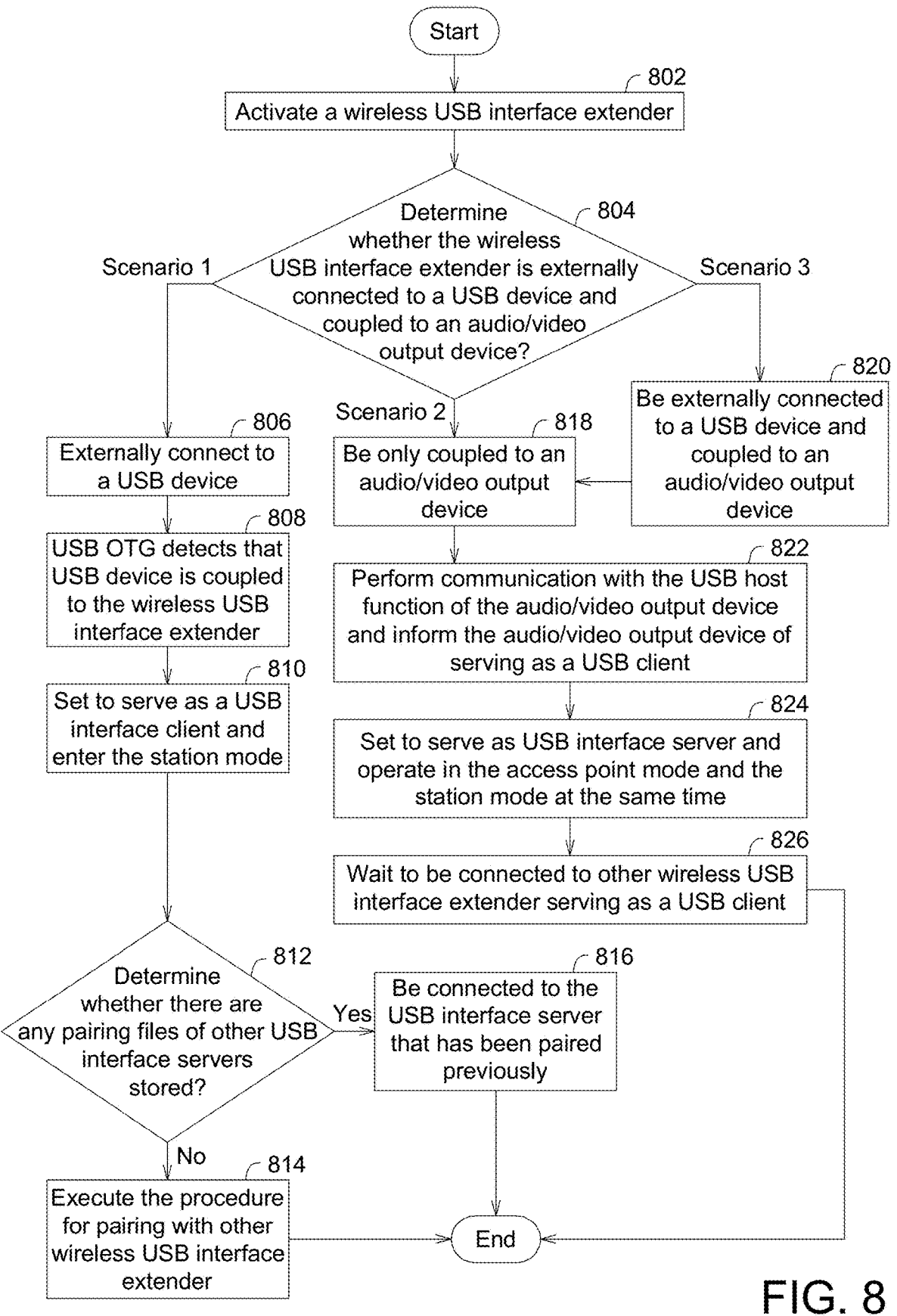
FIG. 8 is a flowchart of an example of a station mode/ access point mode setting procedure of a wireless USB interface extender.

Referring to FIG. 8, a flowchart of an example of a station mode/access point mode setting procedure of a wireless USB interface extender is shown. Firstly, the method begins with step 802, a wireless USB interface extender 100 is activated. Afterwards, the method proceeds to step 804, whether the wireless USB interface extender 100 is externally connected to a USB device and coupled to an audio/video output device is determined. In scenario 1, the wireless USB interface extender 100 is only externally connected to a USB device. In scenario 2, the wireless USB interface extender 100 is only coupled to the audio/video output device. In scenario 3, the wireless USB interface extender 100 is externally connected to a USB device and coupled to the audio/video output device. In scenario 1, the method proceeds to step 806. In scenario 2, the method proceeds to step 818. In scenario 3, the method proceeds to step 820.

In step 806, the wireless USB interface extender 100 is externally connected to a USB device. For example, the USB connector of a USB device is inserted to the wired input port 404 of the wireless USB interface extender 100 of FIG. 4A. For example, the USB connector of the USB voice capture device 212 is inserted to the wired input port 404 of the wireless USB interface extender 100(6). Then, the method proceeds to step 808, when the USB OTG of the control unit 106 of the wireless USB interface extender 100 detects that the USB device is coupled to the wireless USB interface extender 100, the driver which can be executed on the control unit 106 is loaded to the control unit 106, so that the control unit 106 can access the USB device coupled to the control unit 106.

Afterwards, the method proceeds to step 810, the wireless USB interface extender 100 sets itself as a USB interface client and enters the station mode, in which the transmit and reception of wireless network packets can be performed by using the first wireless transmission unit 102, for example.

Then, the method proceeds to step 812, whether there are any pairing files of other USB interface servers stored in the wireless USB interface extender 100 is determined by the wireless USB interface extender 100. When no pairing files are stored, the method proceeds to step 814, the procedure for pairing with other wireless USB interface extender is executed. When the pairing files are found, the method proceeds to step 816, the first wireless transmission unit 102 of the wireless USB interface extender is directly connected to the USB interface server that has been paired previously and starts to transmit the data of the USB device connected to the wireless USB interface extender.

In step 818, the wireless USB interface extender 100 is only coupled to the audio/video output device (such as a computer). In step 820, the wireless USB interface extender 100 is externally connected to a USB device and coupled to an audio/video output device (such as a computer). After step 820, when the wireless USB interface extender 100 is coupled to an audio/video output device, the method proceeds to step 818.

After step 818, the method proceeds to step 822, communication with the USB host function of the audio/video output device (such as a computer) is performed by the USB function of the wireless USB interface extender 100. The audio/video output device is informed that the wireless USB interface extender 100 serves as a USB client. Afterwards, the method proceeds to step 824, the wireless USB interface extender 100 sets itself as a USB interface server, activates the first wireless transmission unit 102 and the second wireless transmission unit 104, and operates in the access point mode and the station mode at the same time. Then, the method proceeds to step 826, the wireless USB interface extender 100 starts to wait to be connected to other wireless USB interface extender serving as a USB client.

Figure 9:
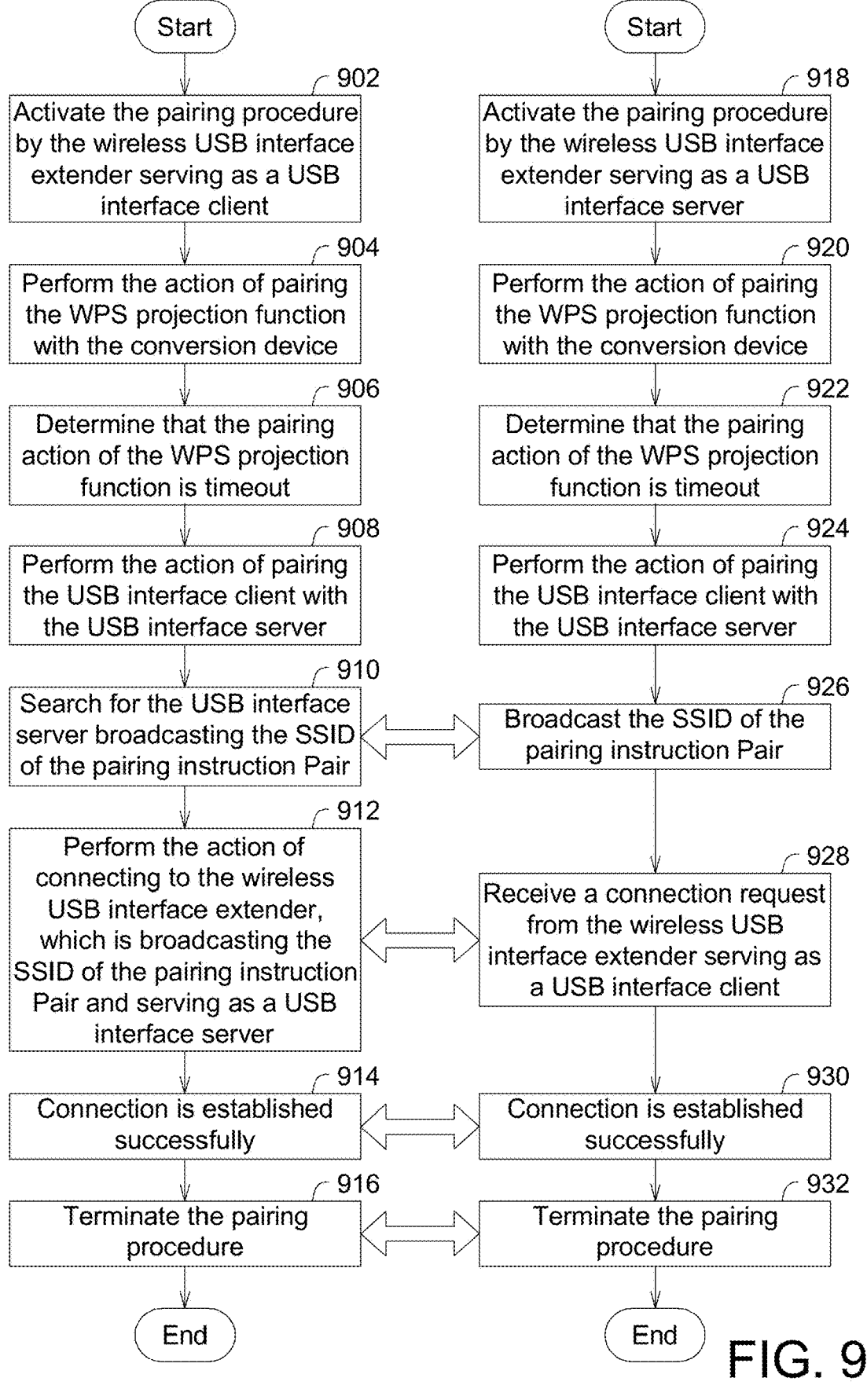
FIG. 9 is a flowchart of an example of a pairing procedure of a wireless USB interface extender.

Referring to FIG. 9, a flowchart of an example of a pairing procedure of a wireless USB interface extender is shown. Steps 902 to 916 form the pairing procedure executed by the wireless USB interface extender serving as a USB interface client; steps 918 to 932 form the pairing procedure executed by the wireless USB interface extender serving as a USB interface server.

Firstly, the method begins with step 902, and the pairing procedure is activated by the wireless USB interface extender serving as a USB interface client. Then, the method proceeds to step 904, the action of pairing the WPS projection function with the conversion device 202 is performed. Afterwards, the method proceeds to step 906, the pairing action of the WPS projection function is determined as timeout. Then, the method proceeds to step 908, the action of pairing the USB interface client with the USB interface server is performed.

Then, the method proceeds to step 910, the USB interface server broadcasting the service set identifier (SSID) (that is, the name of the wireless network) of the pairing instruction Pair is searched by the wireless USB interface extender serving as a USB interface client. The USB interface server is other wireless USB interface extender serving as a USB interface server.

Then, the method proceeds to step 912, the action of connecting to the wireless USB interface extender, which is broadcasting the SSID of the pairing instruction Pair and serving as a USB interface server, is performed by the wireless USB interface extender serving as a USB interface client. For example, the wireless USB interface extender serving as a USB interface client outputs a connection request and performs connection using a preset password.

After that, the method proceeds to step 914, the connection between the wireless USB interface extender serving as a USB interface server and the wireless USB interface extender serving as a USB interface client is successfully established. The wireless USB interface extender serving as a USB interface server is further requested to provide relevant connection setting information, such as access point code and password, by the wireless USB interface extender serving as a USB interface client.

Then, the method proceeds to step 916, the pairing procedure is terminated by the wireless USB interface extender serving as a USB interface client, which maintains connection with the wireless USB interface extender serving as a USB interface server using the obtained relevant connection setting information.

In step 918, the pairing procedure is activated by the wireless USB interface extender serving as a USB interface server. Then, the method proceeds to step 920, the action of pairing the WPS projection function with the conversion device 202 is performed. Afterwards, the method proceeds to 922, the pairing action of the WPS projection function is determined as timeout. Then, the method proceeds to step 924, the action of pairing the USB interface client with the USB interface server is performed.

Then, the method proceeds to step 926, the SSID of the pairing instruction Pair is broadcasted by the wireless USB interface extender serving as a USB interface server, so that the wireless USB interface extender serving as a USB interface client can search the SSID.

Then, the method proceeds to step 928, a connection request is received from the wireless USB interface extender serving as a USB interface client by the wireless USB interface extender serving as a USB interface server. After that, the method proceeds to step 930, connection between the wireless USB interface extender serving as a USB interface server and the wireless USB interface extender serving as a USB interface client is successfully established, relevant connection setting information are transmitted by the wireless USB interface extender serving as a USB interface server, and the wireless USB interface extender serving as a USB interface client whose connection is successfully established is recorded in the client list.

Then, the method proceeds to step 932, the pairing procedure is terminated by the wireless USB interface extender serving as a USB interface server. Then, the wireless USB interface extender serving as a USB interface server broadcasts its access point code again under operating in the access point mode and waits for the connection with the wireless USB interface extender serving as a USB interface client.

Figures 10A, 10B:
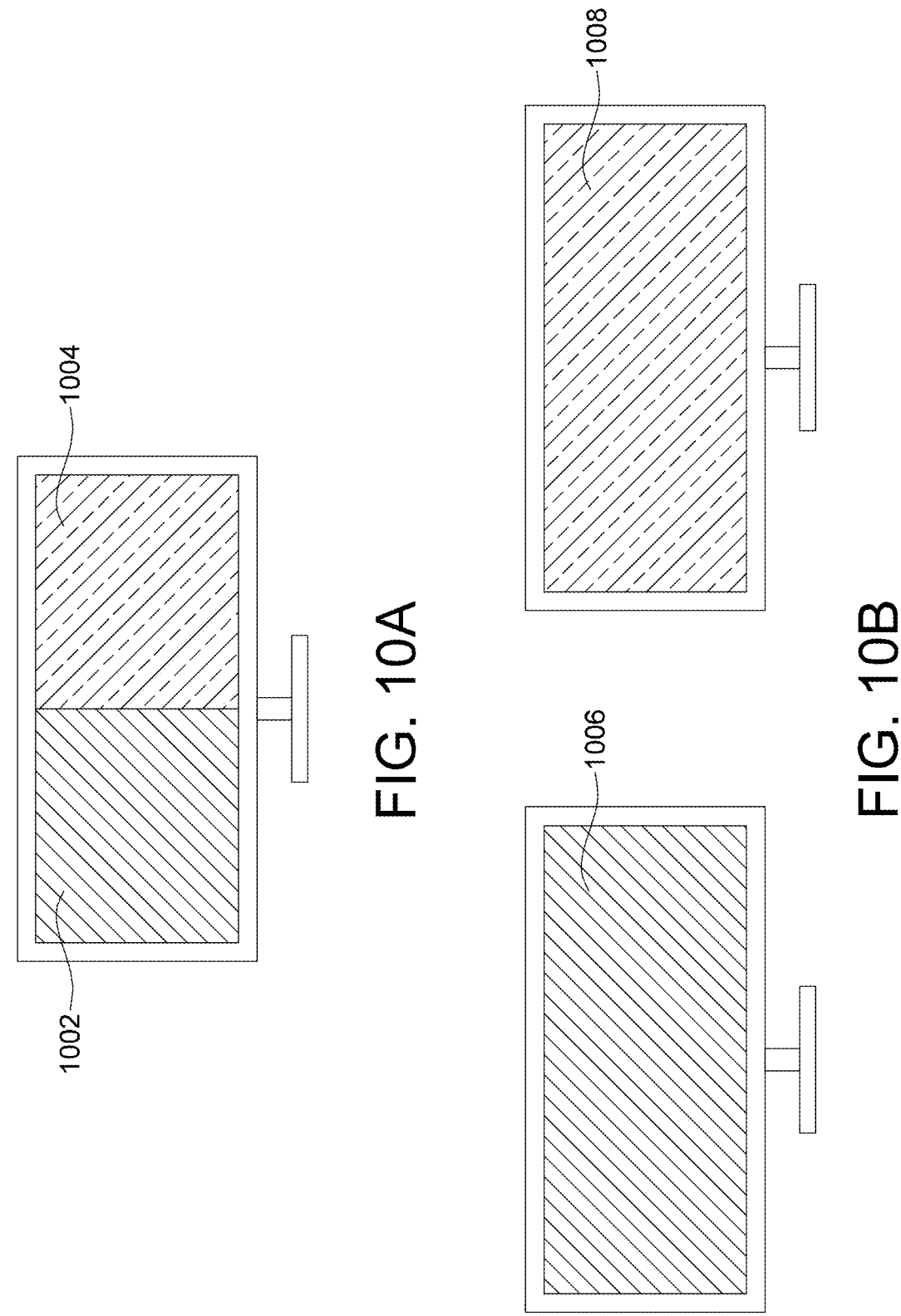
FIG. 10A and FIG. 10B are schematic diagrams of an integrated signal displayed by a display device according to an embodiment of the present disclosure.

Referring to FIG. 10A and FIG. 10B, schematic diagrams of an integrated signal displayed by a display device according to an embodiment of the present disclosure are shown. Refer to FIG. 1 and FIG. 2 as well. When the wireless USB interface extender 100 operates in the station mode and the access point mode at the same time, the control unit 106 is further used to process a to-be-displayed picture and a first signal corresponding to at least one of the at least one USB device to generate an integrated signal. The integrated signal is transmitted to the display device 204 through the conversion device 202 for displaying on the display device 204.

The following descriptions are exemplified by the wireless USB interface extender 100(3) and the wireless USB interface extender 100(5). The wireless USB interface extender 100(3) is coupled to the image output device 206(3); the wireless USB interface extender 100(5) is coupled to the USB image capture device 210. The wireless USB interface extender 100(3) receives a first image signal image_1 from the image output device 206(3); the wireless USB interface extender 100(5) receives a second image signal image_2 from the USB image capture device 210. The first image signal image_1 is a picture to be displayed by the image output device 206(3), such as a picture to be displayed on the monitor of the image output device 206(3) (such as a computer).

When the wireless USB interface extender 100(3) operates in the station mode and the access point mode at the same time, the control unit 106 of the wireless USB interface extender 100(3) processes the to-be-displayed picture and the second image signal image_2 of the USB image capture device 210, that is, the first image signal image_1 and the second image signal image_2, to generate an integrated signal image_C.

As shown in FIG. 10A, based on the integrated signal image_C, the display device 204 displays the first image signal image_1 and the second image signal image_2 according to settings. For example, the display region of the display device 204 can be horizontally divided into region 1002 and region 1004 arranged side by side. The first image signal image_1 is displayed in the region 1002, and the second image signal image_2 is displayed in the region 1004. The integrated signal image_C having the first image signal image_1 and the second image signal image_2 are integrated by the video converter 110 then are outputted by the video converter 110.

In another example as shown in FIG. 10B, the display device 204 may include a first monitor 1006 and a second monitor 1008. Based on the integrated signal image_C, the first monitor 1006 is used to display the first image signal image_1, and the second monitor 1008 is used to display the second image signal image_2 of the USB image capture device 210. However, the present disclosure is limited to the above display arrangement; the first image signal image_1 and the second image signal image_2 can be concurrently displayed in other manners, such as a picture-in-picture manner or a superposition manner.

Furthermore, the integrated signal can have a number of ways of implementations. The following descriptions are exemplified by the wireless USB interface extender 100(3), the wireless USB interface extender 100(5), and the wireless USB interface extender 100(6). Suppose the wireless USB interface extender 100(3) receives a first video signal Video_1 and a first audio signal Audio_1 from the image output device 206(3), the wireless USB interface extender 100(5) receives a second video signal Video_2 from the USB image capture device 210, and the wireless USB interface extender 100(6) receives a second audio signal Audio_2 from the USB voice capture device 212.

When the wireless USB interface extender 100(3) operates in the station mode and the access point mode at the same time, the control unit 106 of the wireless USB interface extender 100(3) processes the first video signal Video_1, the first audio signal Audio_1, the second video signal Video_2, and the second audio signal Audio_2. For example, the control unit 106 of the wireless USB interface extender 100(3) integrates the first video signal Video_1, the first audio signal Audio_1, the second video signal Video_2, and the second audio signal Audio_2 as a frame concurrently displaying two audio/video signals to generate an integrated signal Audio_Video_C. As shown in FIG. 10A, the audio/video signal Audio_Video_1 corresponding to the first video signal Video_1 and the first audio signal Audio_1 is displayed in the region 1002, and the audio/video signal Audio_Video_2 corresponding to the second video signal Video_2 and the first audio signal Audio_2 is displayed in the region 1004. The integrated signal Audio_Video_C is composed of the audio/video signal Audio_Video_1 and the audio/video signal Audio_Video_2, which are arranged side by side.

Or, as shown in FIG. 10B, the audio/video signal Audio_Video_1 of the integrated signal Audio_Video_C is displayed by the first monitor 1006, and the audio/video signal Audio_Video_2 of the integrated signal Audio_Video_C is displayed by the second monitor 1008. However, the present disclosure is not limited thereto, and the integrated signal Audio_Video_C also can be displayed by using other methods. For example, the audio/video signal Audio_Video_1 and the audio/video signal Audio_Video_2 can be displayed in a picture-in-picture manner or a superposition manner.

According to an embodiment of the present disclosure, a wireless projection system is further provided. The wireless projection system includes a first wireless USB interface extender, a second wireless USB interface extender, and a conversion device. Each of the first wireless USB interface extender and the second wireless USB interface extender includes a first wireless transmission unit, a second wireless transmission unit and a control unit. The control unit is used to control the first wireless transmission unit and the second wireless transmission unit. The control unit of the first wireless USB interface extender or the second wireless USB interface extender is further used to enable each of the first wireless transmission unit and the second wireless transmission unit of the first wireless USB interface extender or each of the first wireless transmission unit and the second wireless transmission unit of the second wireless USB interface extender to operate in at least one of a station mode and an access point mode. The conversion device is coupled to a display device.

When the first wireless USB interface extender operates in the station mode, the first wireless USB interface extender communicates with the conversion device by using the first wireless transmission unit. When the first wireless USB interface extender operates in the access point mode, the first wireless USB interface extender communicates with the second wireless USB interface extender by using the second wireless transmission unit. The second wireless USB interface extender is coupled to at least one first USB device. When the first wireless USB interface extender operates in the station mode and the access point mode at the same time, the control unit of the first wireless USB interface extender is further used to process a to-be-displayed picture and a first signal of at least one first USB device to generate a first integrated signal. The first integrated signal is transmitted to the display device through the conversion device for displaying on the display device.

The conversion device can further be wirelessly connected to a third USB device. The conversion device is used to process the first integrated signal and a third signal of the third USB device to generate a second integrated signal. The second integrated signal is transmitted to the display device for displaying on the display device.

The third USB device includes a second USB image capture device, and the third signal is a second image signal. The conversion device is used to process the first integrated signal and the second image signal to generate a second integrated signal.

Based on the second integrated signal, the display device displays a to-be-displayed picture, the first image signal of the first USB image capture device, and the second image signal of the second USB image capture device according to the settings.

The display device includes a first monitor, a second monitor and a third monitor. Based on the second integrated signal, the first monitor is used to display a to-be-displayed picture, the second monitor is used to display the first image signal of the first USB image capture device, and the third monitor is used to display the second image signal of the second USB image capture device.

By modifying relevant firmware of wireless transmission of the conversion device, the wireless USB interface extender serving as a USB interface client also can perform wireless connection with the conversion device serving as an access point.

Refer to FIG. 2 again. In an example, the conversion device 202 also can perform wireless connection with the wireless USB interface extenders 100(5) and the wireless USB interface extender 100(6). When the wireless USB interface extender 100(3) transmits the first video signal Video_1' and the first audio signal Audio_1' to the conversion device 202, the conversion device 202 also can receive the second video signal Video_2' from the wireless USB interface extenders 100(5) and receive the second audio signal Audio_2' from the wireless USB interface extender 100(6). The conversion device 202 can process the first video signal Video_1', the first audio signal Audio_1', the second video signal Video_2', and the second audio signal Audio_2'. For example, the conversion device 202 can integrate the first video signal Video_1', the first audio signal Audio_1', the second video signal Video_2', and the second audio signal Audio_2' as a frame concurrently displaying two audio/video signals to generate an integrated signal Audio_Video_C'. As shown in FIG. 10A, the audio/video signal Audio_Video_1' corresponding to the first video signal Video_1' and the first audio signal Audio_1' is displayed in the region 1002, and the audio/video signal Audio_Video_2' corresponding to the second video signal Video_2' and the second audio signal Audio_2' is displayed in the region 1004. The integrated signal Audio_Video_C' is composed of the audio/video signal Audio_Video_1' and the audio/video signal Audio_Video_2', which are arranged side by side.

Or, as shown in FIG. 10B, the audio/video signal Audio_Video_1' of the integrated signal Audio_Video_C' is displayed by the first monitor 1006, and the audio/video signal Audio_Video_2' of the integrated signal Audio_Video_C' is displayed by the second monitor 1008. However, the present disclosure is not limited thereto, and the integrated signal Audio_Video_C' and the integrated signal Audio_Video_C also can be displayed by using other methods. For example, the audio/video signal Audio_Video_1' and the audio/video signal Audio_Video_2' can be displayed in a picture-in-picture manner or a superposition manner.

The present disclosure further provides a method for wirelessly connecting a wireless USB interface extender during use in a wireless projection system. The method includes the following steps. A wireless USB interface extender, having a first wireless transmission unit, a second wireless transmission unit and a control unit, is provided. The control unit is used to control the first wireless transmission unit and the second wireless transmission unit and enable each of the first wireless transmission unit and the second wireless transmission unit to operate in at least one of a station mode and an access point mode. When operating in the station mode, the wireless USB interface extender communicates with a conversion device by using the first wireless transmission unit, wherein the conversion device is coupled to a display device. When operating in the access point mode, the wireless USB interface extender communicates with at least one other wireless USB interface extender by using the second wireless transmission unit, wherein each of at least one other wireless USB interface extender is coupled to at least one USB device. When the wireless USB interface extender operates in the station mode and the access point mode at the same time, the control unit is used to process a to-be-displayed picture and a first signal corresponding to at least one of the at least one USB device to generate an integrated signal, which is transmitted to the display device through the conversion device for displaying on the display device.

When operating in the station mode and the access point mode at the same time, the wireless USB interface extender communicates with at least one USB device coupled to at least one other wireless USB interface extender. The control unit is further used to process a second signal corresponding to at least one of the at least one USB device coupled to at least one other wireless USB interface extender and communicate with an operating system of a host by using a standard USB driver, so that the operating system can retrieve at least one of the at least one USB device by identifying the at least one of the at least one USB device as a USB device of the host by using the standard USB driver.

The method for wirelessly connecting a wireless USB interface extender during use in a wireless projection system, and the wireless projection system and the wireless USB interface extender of the present disclosure are provided with both "wireless projection function" and "wireless USB interface extender function". When serving as a wireless USB interface, the wireless USB interface extender can be manually set to a USB interface client or a USB interface server by the user. Also, the wireless USB interface extender can be set to operate in an automatic detection mode, in which the wireless USB interface extender can be switched to a USB interface client or a USB interface server based on automatic detection, and there is no need to convert the signal of the USB device by using a conversion device.

When the wireless USB interface extender of the present disclosure only has a wireless transmission module, this wireless transmission module can serve as an access point for connecting to other wireless client and serve as a client for connecting to other access points. When providing "wireless projection function", the wireless USB interface extender is set to serve as a client. When the "wireless USB interface extender function" is activated, the access point function of the wireless USB interface extender will also be activated, so that the wireless USB interface extender can serve as both an access point and a client, that is, dual mode.

The object of providing the wireless USB interface extender of the present disclosure with two wireless transmission modules can be achieved by replacing the cable having a wireless transmission module. Thus, the first wireless transmission module disposed on the circuit board of the wireless USB interface extender can be used to provide a "wireless projection function", and the second wireless transmission module disposed on the cable can be used to provide a "wireless USB interface" function. When only the "wireless projection function" is required, the cable having a wireless transmission module can be dispensed. When both the "wireless projection function" and the "wireless USB interface" function are required, the cable can be replaced with the cable having the second wireless transmission module, that is, the "wireless USB interface" function is provided by an exclusive wireless transmission module, not only increasing the speed and efficiency of wireless transmission but further increasing the processing speed of the control unit.

The method for wirelessly connecting a wireless USB interface extender during use in a wireless projection system, and the wireless projection system and the wireless USB interface extender of the present disclosure can be used in the conference system of a conference room. When the image projection function is performed, the signal of a USB device can be integrated and displayed on the display device at the same time. Thus, with a display device (such as a projection monitor), the user can view the image or the audio/video signal of an audio/video output device (such as a computer) and the image or the audio/video signal of a USB image capture device or a USB voice capture device, which is indeed very convenient.

Besides, in the meeting with many participants, there are scenarios where the microphone needs to be moved to different positions so that the spokespersons' speeches can be clearly received. Also, there are scenarios where the camera needs to be moved to different positions so that the spokespersons' facial expressions or the full scene image can be captured. The speaker or loudspeaker also needs to be installed at suitable positions so that the audience can clearly listen to the content of presentation. For the USB devices of the embodiments of the present disclosure, there is no need to transmit relevant signals of the USB devices via USB transmission lines, the arrangement of the USB devices according to embodiments of the present disclosure is flexible and is not subjected to the length, wiring location, and layout of the transmission lines. Thus, in terms of the disposition of relevant hardware for conference room meeting, excellent flexibility and convenience can be achieved. Since the USB devices are connected to the audio/video output device (such as a computer) by using a wireless USB interface extender capable of integrating the signal outputted by the audio/video output device (such as a computer) and the signal of the USB device, the user can clearly and directly receive the signal outputted by the audio/video output device (such as a computer) and the signal of the USB device through the display device without complicated operations of switching or plugging/unplugging the USB device. Thus, the efficiency and convenience of meeting can be effectively increased.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A method for wirelessly connecting to a wireless USB interface extender during use in a wireless projection system, comprising:
   providing a wireless USB interface extender having a first wireless transmission unit, a second wireless transmission unit and a control unit, wherein the control unit is used to control the first wireless transmission unit and the second wireless transmission unit and enable each of the first wireless transmission unit and the second wireless transmission unit to operate in at least one of a station mode and an access point mode;
   wherein when the wireless USB interface extender operates in the station mode, the wireless USB interface extender communicates with a conversion device by using the first wireless transmission unit, the conversion device is coupled to a display device;
   wherein when the wireless USB interface extender operates in the access point mode, the wireless USB interface extender communicates with at least one other wireless USB interface extender by using the second wireless transmission unit, each of at least one other wireless USB interface extender is coupled to at least one USB device; and
   wherein when the wireless USB interface extender operates in the station mode and the access point mode at the same time, the control unit processes a to-be-displayed picture and a first signal corresponding to at least one of the at least one USB device;
   wherein when the wireless USB interface extender operates in the station mode and the access point mode at the same time, the wireless USB interface extender communicates with the at least one USB device coupled to the at least one other wireless USB interface extender, and the control unit is further used to process a second signal corresponding to at least one of the at least one USB device, coupled to the at least one other wireless USB interface extender, and communicate with an operating system of a host by using a standard USB driver, so that the operating system can retrieve at least one of the at least one USB device by identifying the at least one of the at least one USB device as a USB device.

2. The method according to claim 1, wherein the first wireless transmission unit and the second wireless transmission unit are respectively implemented by a first wireless transmission module and a second wireless transmission module; or the first wireless transmission unit and the second wireless transmission unit are implemented by a third wireless transmission module.

3. The method according to claim 1, wherein the at least one USB device comprises a USB image capture device;

wherein when the wireless USB interface extender operates in the station mode and the access point mode at the same time, the control unit processes the to-be-displayed picture and an image signal of the USB image capture device.

4. The method according to claim 3, wherein the display device displays the picture and the image signal of the USB image capture device according to the settings.

5. The method according to claim 1, wherein the wireless USB interface extender further comprises a lever element, the lever element can be switched to a server option, a client option, and an automatic switch option;

wherein when the lever element is switched to the server option, the wireless USB interface extender operates in the access point mode;

wherein when the lever element is switched to the client option, the wireless USB interface extender operates in the station mode.

6. The method according to claim 5, wherein the wireless USB interface extender further comprises a wired input port;

wherein when the lever element is switched to the automatic option, the wireless USB interface extender automatically operates in the station mode under the situation that another USB device is inserted to the wired input port.

7. The method according to claim 1, wherein the wireless USB interface extender further comprises a body and a dongle, the dongle is pluggably connected to the body, and the second wireless transmission unit is disposed on the dongle.

8. The method according to claim 1, wherein the wireless USB interface extender further comprises a body and a cable, the cable is detachably connected to the body, and the second wireless transmission unit is disposed in the cable.

9. A wireless projection system, comprising:

a first wireless USB interface extender and a second wireless USB interface extender, each comprising a first wireless transmission unit, a second wireless transmission unit and a control unit, wherein the control unit is used to control the first wireless transmission unit and the second wireless transmission unit, the control unit of the first wireless USB interface extender or the second wireless USB interface extender is further used to enable each of the first wireless transmission unit and the second wireless transmission unit of the first wireless USB interface extender or each of the first wireless transmission unit and the second wireless transmission unit of the second wireless USB interface extender to operate in at least one of a station mode and an access point mode; and a conversion device coupled to a display device;

wherein when the first wireless USB interface extender operates in the station mode, the first wireless USB interface extender communicates with the conversion device by using the first wireless transmission unit;

wherein when the first wireless USB interface extender operates in the access point mode, the first wireless USB interface extender communicates with the second wireless USB interface extender by using the second wireless transmission unit, the second wireless USB interface extender is coupled to at least one first USB device;

wherein when the first wireless USB interface extender operates in the station mode and the access point mode at the same time, the control unit of the first wireless USB interface extender is used to process a to-be-displayed picture and a first signal of the at least one first USB device;

wherein when the first wireless USB interface extender operates in the station mode and the access point mode at the same time, the first wireless USB interface extender communicates with the at least one USB device coupled to the second wireless USB interface extender, the control unit processes a second signal corresponding to at least one of the at least one USB device coupled to the second wireless USB interface extender and communicate with an operating system of a host by using a standard USB driver, so that the operating system can retrieve at least one of the at least one USB device by identifying the at least one of the at least one USB device as a USB device of the host.

10. The wireless projection system according to claim 9, wherein the first wireless transmission unit and the second wireless transmission unit are respectively implemented by a first wireless transmission module and a second wireless transmission module, or the first wireless transmission unit and the second wireless transmission unit are implemented by a third wireless transmission module.

11. The wireless projection system according to claim 9, wherein the first USB device comprises a first USB image capture device;

wherein when the first wireless USB interface extender operates in the station mode and the access point mode at the same time, the control unit of the first wireless USB interface extender is used to process the to-be-displayed picture and a first image signal of the first USB image capture device.

12. The wireless projection system according to claim 11, wherein the display device displays the to-be-displayed picture and the first image signal of the first USB image capture device according to the settings.

13. The wireless projection system according to claim 9, wherein each of the first wireless USB interface extender and the second wireless USB interface extender further comprises a lever element, the lever element can be switched to a server option, a client option, and an automatic switch option;

wherein when the lever element of the first wireless USB interface extender or the second wireless USB interface extender is switched to the server option, the first wireless USB interface extender or the second wireless USB interface extender operates in the access point mode;

wherein when the lever element of the first wireless USB interface extender or the second wireless USB interface extender is switched to the client option, the first wireless USB interface extender or the second wireless USB interface extender operates in the station mode.

14. The wireless projection system according to claim 13, wherein each of the first wireless USB interface extender and the second wireless USB interface extender further comprises a wired input port;

wherein when the lever element of the first wireless USB interface extender or the second wireless USB interface extender is switched to the automatic option, the first wireless USB interface extender or the second wireless USB interface extender automatically operates in the station mode under the situation that a second USB device is inserted to the wired input port of the first wireless USB interface extender or the second wireless USB interface extender.

15. The wireless projection system according to claim 9, wherein each of the first wireless USB interface extender and the second wireless USB interface extender further comprises a body and a dongle, the dongle is pluggably connected to the body, and the second wireless transmission unit is disposed on the dongle.

16. The wireless projection system according to claim 9, wherein each of the first wireless USB interface extender and the second wireless USB interface extender further comprises a body and a cable, the cable is detachably connected to the body, and the second wireless transmission unit is disposed in the cable.

17. A wireless universal serial bus (USB) interface extender, comprising:

a first wireless transmission unit and a second wireless transmission unit; and a control unit, configured to control the first wireless transmission unit and the second wireless transmission unit, wherein the control unit is further configured to enable each of the first wireless transmission unit and the second wireless transmission unit to operate in at least one of a station mode and an access point (AP) mode;

wherein when the wireless USB interface extender operates in the station mode, the wireless USB interface extender communicates with a conversion device by using the first wireless transmission unit, the conversion device is coupled to a display device;

wherein when the wireless USB interface extender operates in the access point mode, the wireless USB interface extender communicates with at least one other wireless USB interface extender by using the second wireless transmission unit, each of at least one other wireless USB interface extender is coupled to at least one USB device;

wherein when the wireless USB interface extender operates in the station mode and the access point mode at the same time, the control unit is further configured to process a to-be-displayed picture and a first signal corresponding to at least one of the at least one USB device;

wherein when the wireless USB interface extender operates in the station mode and the access point mode at the same time, the wireless USB interface extender communicates with the at least one USB device coupled to the at least one other wireless USB interface extender, and the control unit is further configured to process a second signal corresponding to at least one of the at least one USB device coupled to the at least one other wireless USB interface extender and communicate with an operating system of a host by using a standard USB driver, so that the operating system can retrieve at least one of the at least one USB device by identifying the at least one of the at least one USB device as a USB device of the host by using the standard USB driver.

18. The wireless USB interface extender according to claim 17, wherein the first wireless transmission unit and the second wireless transmission unit are respectively implemented by a first wireless transmission module and a second wireless transmission module, or the first wireless transmission unit and the second wireless transmission unit are implemented by a third wireless transmission module.

19. The wireless USB interface extender according to claim 17, wherein the at least one USB device comprises a USB image capture device;

wherein when the wireless USB interface extender operates in the station mode and the access point mode at the same time, the control unit is further configured to process the to-be-displayed picture and an image signal of the USB image capture device.

20. The wireless USB interface extender according to claim 19, wherein the display device displays the picture and the image signal of the USB image capture device according to settings.

21. The wireless USB interface extender according to claim 17, further comprising a lever element, the lever element can be switched to a server option, a client option, and an automatic switch option;

wherein when the lever element is switched to the server option, the wireless USB interface extender operates in the access point mode;

wherein when the lever element is switched to the client option, the wireless USB interface extender operates in the station mode.

22. The wireless USB interface extender according to claim 21, further comprising a wired input port;

wherein when the lever element is switched to the automatic option, the wireless USB interface extender automatically operates in the station mode under the situation that another USB device is inserted to the wired input port.

23. The wireless USB interface extender according to claim 17, further comprising a body and a dongle, the dongle is pluggably connected to the body, and the second wireless transmission unit is disposed on the dongle.

24. The wireless USB interface extender according to claim 17, further comprising a body and a cable, the cable is detachably connected to the body, and the second wireless transmission unit is disposed in the cable.

* * * * *